United States Patent
Sugimoto et al.

(10) Patent No.: US 7,253,233 B2
(45) Date of Patent: Aug. 7, 2007

(54) ELASTOMER COMPOSITION AND RUBBER ROLLER

(75) Inventors: Mutsuki Sugimoto, Hyogo (JP); Hideyuki Okuyama, Hyogo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 326 days.

(21) Appl. No.: 10/839,242

(22) Filed: May 6, 2004

(65) Prior Publication Data

US 2004/0225061 A1 Nov. 11, 2004

(30) Foreign Application Priority Data

May 7, 2003 (JP) .............................. 2003-128604

(51) Int. Cl.
*C08L 53/02* (2006.01)
(52) U.S. Cl. .......................................... 525/89; 525/99
(58) Field of Classification Search .................. 525/89, 525/99
See application file for complete search history.

(56) References Cited

U.S. PATENT DOCUMENTS

2004/0151933 A1 * 8/2004 Ajbani et al. ............... 428/515

2004/0176524 A1 * 9/2004 Ikuji et al. ................... 524/505

FOREIGN PATENT DOCUMENTS

| JP | 11-228708 | 8/1999 |
| JP | 2003-3038 | * 1/2003 |

OTHER PUBLICATIONS

Ikuji, DERWENT-ACC-No. 2003-183983, Oct. 2004.*

* cited by examiner

*Primary Examiner*—Jeffrey Mullis
(74) *Attorney, Agent, or Firm*—Birch, Stewart, Kolasch & Birch, LLP

(57) ABSTRACT

An elastomer composition is prepared that contains a rubber component (A) containing at least one of diene rubber and EPDM rubber; a mixture composition (B) containing hydrogenated styrene thermoplastic elastomer and olefin resin; and a styrene thermoplastic elastomer (C) having double bonds partly left, wherein the styrene thermoplastic elastomer (C) is blended at a ratio of not less than 2 parts by weight and not more than 100 parts by weight with respect to 200 parts by weight of the mixture composition (B), and the rubber component (A) is dispersed by dynamic crosslinking in the mixture composition (B) having the styrene thermoplastic elastomer (C) dispersed therein. A rubber roller is formed by using the elastomer composition. The elastomer composition is excellent in wear resistance, and the rubber roller made of the elastomer composition is excellent in wear resistance at the time of idling rotation.

5 Claims, 1 Drawing Sheet

ELASTOMER COMPOSITION AND RUBBER ROLLER

This Nonprovisional application claims priority under 35 U.S.C. § 119(a) on Patent Application No(s). 2003-128604 filed in Japan on May 7, 2003, the entire contents of which are hereby incorporated by reference.

BACKGROUND OF THE INVENTION

1. Field of the Invention

The present invention relates to an elastomer composition and a rubber roller formed by using the elastomer composition. More particularly, the present invention relates to an elastomer composition which is extremely excellent in wear resistance while having a suitable hardness and which is suitably used as a rubber roller used in a paper feeding mechanism of OA equipment such as an inkjet printer, a laser printer, an electrostatic copying apparatus or a facsimile apparatus, or an automatic deposit payment machine (ATM), or the like, as well as to a method of producing the same.

2. Description of the Background Art

A paper feeding rubber roller made of a rubber composition, an elastomer composition, or the like is used in a paper feeding mechanism for conveying paper, film, or the like in OA equipment such as an inkjet printer, a laser printer, an electrostatic copying apparatus or a facsimile apparatus, in an automatic deposit payment machine (ATM), or the like.

In recent years, OA equipment for personal use is particularly increasing in number, and multiple kinds of paper are passed therethrough. In order to obtain stable conveying property for paper, film, or the like for multiple kinds of paper, there is a demand for ensuring a high wear resistance and a high friction coefficient. Thus, various proposals are made on elastomer compositions, rubber compositions, and the like suitable for use as a rubber roller such as described above.

For example, in order to obtain a large friction coefficient to paper and an excellent wear resistance when used in a paper feeding rubber roller, the applicant of the present invention proposed in Japanese Laid-open Patent Publication 11-228708 a rubber composition containing 100 to 300 parts by weight of hydrogenated styrene thermoplastic elastomer with respect to 100 parts by weight of rubber where the rubber is dynamically crosslinked by a resin crosslinking agent and dispersed in the hydrogenated styrene thermoplastic elastomer.

The rubber composition proposed in the above-mentioned patent document is excellent in wear resistance with low hardness and can keep exhibiting a good paper feeding performance for a long period of time. In recent years, however, inkjet printers, laser beam printers, copying apparatus, and the like such as described above tend to have a reduced number of components for the purpose of cost reduction, so that the load imposed on the rubber roller is increasing thereby demanding those that can exhibit a higher performance.

In particular, in order to simplify the paper feeding mechanism, a mechanism is proposed having a construction such that the rubber roller rotates by idling relative to a releasing member each time a sheet of paper is fed. For this reason, not only the friction coefficient but also the wear resistance must be enhanced. In particular, against the friction generated when the rubber roller is slipped by receiving load such as in idling rotation, a high mechanical strength is required, and a high tensile strength TB is required.

In conventional paper feeding rubber rollers, it was sufficient to have a wear resistance of a degree such as required against the friction generated by slight slippage on paper when the paper was fed. Also, since the load imposed on the rubber roller was low, mechanical strength such as tensile strength was not so important. Regarding vulcanized rubber, it is possible to prepare a blend having a tensile strength TB high to some extent and a high friction coefficient. However, methods of producing vulcanized rubber will be costly. Therefore, it is desired to prepare a rubber roller in a step of resin with the use of a thermoplastic elastomer composition in view of good productivity and excellent physical property.

Further, even Example 1 and Example 1a providing the highest performance in the above-mentioned patent document can provide a tensile strength TB of 4.0 MPa. With this tensile strength, a large amount of rubber powder is created to reduce the weight greatly by wear when the rubber roller is rotated by idling and worn.

The present invention has been made in order to solve the aforementioned problems of the prior art, and an object of the present invention is to provide an elastomer composition being extremely excellent in wear resistance while having a suitable hardness as well as a method of producing the elastomer composition. Another object of the present invention is to provide a rubber roller that realizes a low hardness and a good wear resistance and is excellent in wear resistance particularly at the time of idling rotation.

SUMMARY OF THE INVENTION

The applicant of the present invention has found out that the wear by idling rotation of rubber rollers is highly correlated to the strength of the materials, and in particular, a high tensile strength (TB) is required. In order to enhance the tensile strength, one may increase the amount of resin components such as polypropylene (PP) in particular. However, if these resin components are large in amount, the hardness Hs will also be high, so that it will be unsuitable as a rubber roller. Further, since resin components and rubber components do not bond with each other well, one cannot expect an improvement in the tensile strength. Thus, the applicant has found out that, by kneading a styrene thermoplastic elastomer having double bonds partly left, the interface is crosslinked by the styrene thermoplastic elastomer having double bonds partly left between molecule chains of resin components and rubber components. As a result of this, the obtained resin composition can raise the tensile strength. The present invention has been achieved based on the above knowledge.

Thus, the present invention provides an elastomer composition containing:

a rubber component (A) containing at least one of diene rubber and EPDM rubber;

a mixture composition (B) containing hydrogenated styrene thermoplastic elastomer and olefin resin; and a styrene thermoplastic elastomer (C) having double bonds partly left, wherein said styrene thermoplastic elastomer (C) is blended at a ratio of not less than 2 parts by weight and not more than 100 parts by weight with respect to 200 parts by weight of said mixture composition (B), and said rubber component (A) is dispersed by dynamic crosslinking in said mixture composition (B) having said styrene thermoplastic elastomer (C) dispersed therein.

In the above-described elastomer composition, the styrene thermoplastic elastomer having double bonds partly left is blended with a mixture of diene rubber or EPDM rubber, styrene thermoplastic elastomer and olefin resin, the interface is crosslinked by the component (C) between the molecules of the resin composition (B) and the rubber component (A), thereby establishing a good bonding between the resin component and the rubber component. As a result of this, the tensile strength of the rubber roller molded from the obtained elastomer composition can be raised to enhance the wear resistance. Therefore, when the rubber roller is used as a paper feeding roller, the wear resistance at the time of idling rotation can be extremely excellent.

The thermoplastic elastomer (C) is blended at a ratio of not less than 2 parts by weight and not more than 100 parts by weight with respect to 200 parts by weight of the mixture composition (B) so as to enhance the compatibility between the rubber phase of the rubber component and the resin phase of the thermoplastic component in the thermoplastic elastomer composition with a good efficiency. If the component (C) is contained at a ratio of less than 2 parts by weight, there will be no effect of compatibility. On the other hand, if the component (C) is contained at a ratio of more than 100 parts by weight, the hardness will be high, thereby raising a problem of decrease in the wear resistance. Preferably, the component (C) is contained at a ratio of not less than 10 parts by weight and not more than 80 parts by weight.

The mixture composition (B) is blended at a ratio of not less than 2 parts by weight and not more than 100 parts by weight with respect to 100 parts by weight of the rubber component (A), and the rubber component (A) is dynamically crosslinked by a resin crosslinking agent.

The mixture composition (B) is blended at a ratio of not less than 2 parts by weight and not more than 100 parts by weight with respect to 100 parts by weight of the rubber component (A) due to the following reason. If the ratio is less than 2 parts by weight, the resin component will be too small in amount, so that the rubber component cannot be dispersed in the resin matrix, thereby raising a problem of difficulty in processing as a rubber roller and decrease in strength. On the other hand, if the ratio exceeds 100 parts by weight, the resin component will be too large in amount, thereby raising a problem of high hardness and a liability of decrease in the wear resistance. Preferably, the ratio is not less than 5 parts by weight and not more than 90 parts by weight.

Diene rubber or EPDM rubber is used so that the dynamic crosslinking will be carried out smoothly. Examples of diene rubber include butyl rubber (IIR), butadiene rubber (BR), isoprene rubber (IR), styrene butadiene rubber (SBR), chloroprene rubber (CR), natural rubber (NR), 1,2-polybutadiene, acrylonitrile-butadiene rubber (NBR). One or more kinds of these rubbers may be used, and they may be mixed with EPDM.

Hydrogenated styrene thermoplastic elastomer is a styrene thermoplastic elastomer which is saturated by hydrogenation to eliminate double bonds. The hydrogenated styrene thermoplastic elastomer has a larger friction coefficient with lower hardness and has a smaller permanent compression set than TPU (thermoplastic urethane elastomer) conventionally used as a matrix. Moreover, because of having no double bonds, the hydrogenated styrene thermoplastic elastomer does not react with resin vulcanizing agents and allows presence of rubber by dispersing the rubber finely in the inside thereof without inhibiting the vulcanization of the rubber. Therefore, an elastomer composition can be prepared having a further lower hardness and a further smaller permanent compression set owing to the influence of the rubber finely dispersed.

The styrene thermoplastic elastomer which is the material of the hydrogenated styrene thermoplastic elastomer is a block copolymer consisting of a terminal block of polystyrene phase (S) and an intermediate block of rubber (elastomer). More specifically, the following styrene thermoplastic elastomers can be used: SBS whose intermediate block of the rubber (elastomer) consists of polybutadiene (B), SIS whose intermediate block of the rubber (elastomer) consists of polyisoprene (I), SES whose intermediate block of the rubber (elastomer) consists of polyethylene, SEPS whose intermediate block of the rubber (elastomer) consists of ethylene/propylene (E/P), SEBS whose intermediate block of the rubber (elastomer) consists of ethylene/butadiene (E/B), and the like. Among these, it is preferable to use the SES, SEPS, and SEBS.

The olefin resin is used in order to provide compatibility between the hydrogenated styrene thermoplastic elastomer and the rubber containing at least one of diene rubber and EPDM rubber. As the olefin resin to be used in the present invention, any one of commercially available olefin resins can be used. For example, polyethylene and polypropylene are preferable, and beside these, one or more kinds selected from ethylene ethyl acrylate resin, ethylene vinyl acetate resin, ethylene-methacrylic acid resin, and ionomer resin or the like can be used.

As the styrene thermoplastic elastomer having double bonds partly left, HYBRAR manufactured by Kuraray Co., Ltd. can be suitably used.

The weight ratio of hydrogenated styrene thermoplastic elastomer and olefin resin in the mixture composition (B) is preferably (hydrogenated styrene thermoplastic elastomer: olefin resin)=(100:0.1) to (2:50), more preferably (100:40) to (10:4).

The hydrogenated styrene thermoplastic elastomer is superior to the olefin resin in view of hardness reduction of the elastomer composition (improvement of frictional force when made into a roller) and increasing the heat resistance and the permanent compression set, while the olefin resin is superior to the hydrogenated styrene thermoplastic elastomer in view of the wear resistance, processability (kneading processability at the time of dynamic crosslinking), and the cost of the elastomer composition. Therefore, in order to compensate for the drawbacks of the two with each other and to enjoy the advantages of the two, the above-mentioned weight ratio is used. If the hydrogenated styrene thermoplastic elastomer is used in an amount more than the above weight ratio, the kneading processability of the rubber composition and the wear resistance of the roller tend to fall, and moreover, the cost of the roller rises. On the other hand, if the hydrogenated styrene thermoplastic elastomer is used in an amount less than the above weight ratio, the heat resistance of the roller deteriorates (the permanent compression set increases), and also the friction coefficient of the roller tends to fall.

The dynamic crosslinking is preferably carried out with the use of a resin crosslinking agent. The resin crosslinking agent is used due to the following reason. If sulfur crosslinking is carried out, blooming is liable to be generated. Particularly, in order to improve the performance such as the strength as a roller, a large amount of vulcanization prompting agent must be blended together with sulfur, so that the friction coefficient of the roller is liable to fall by blooming. Further, if the crosslinking is carried out with peroxide, poor dispersion of the crosslinking agent is generated during the kneading, leading to explosive reaction of peroxide, whereby the kneaded product is ejected and the processing tends to be impossible. The amount of blending the resin crosslinking agent depends on the kind of the crosslinking agent; however, the amount is preferably 6 parts by weight to 18 parts by weight with respect to 100 parts by weight of the rubber component (A).

Examples of the resin vulcanizing agent include alkylphenol formaldehyde resin, melanin formaldehyde condensate, triazine formaldehyde condensate, sulfurized-p-tertiary butyl phenol resin, alkylphenol sulfide resin, and hexamethoxymethyl melanin resin. Among these, phenol resins are preferable, and in particular, it is preferable to use alkylphenol formaldehyde resin (reactive phenol resin). When alkylphenol formaldehyde resin is used, good crosslinking is achieved as compared with the case of using other resin crosslinking agents, whereby the strength (wear resistance) of the elastomer composition will be improved, and moreover, the heat resistance when made into a roller will be improved, and the permanent compression set will be smaller. This seems to be due to change in the crosslinking density. Here, a catalyst such as silver chloride can be added together with a resin crosslinking agent.

In order to carry out the crosslinking reaction properly, a crosslinking aiding agent (activating agent) may be used. As the crosslinking aiding agent, metal oxide is used, and particularly zinc oxide and zinc carbonate are preferable.

Further, in the elastomer composition of the present invention, commercially available petroleum softeners and plasticizers can be used as a softener. For example, aromatic, teflon (R), and paraffin petroleum softeners and phthalate, adipate, sebacate, phosphate, polyether, polyester plasticizers and others can be used. The petroleum softeners used herein include commercially available petroleum softeners and, when the rubber dynamically vulcanizable by the aforementioned resin crosslinking agent is an oil-extended rubber, the oil component contained in the oil-extended rubber.

The softener is blended at a ratio of 10 parts by weight to 200 parts by weight with respect to 100 parts by weight of the rubber component (A) due to the following reason. If the softener is contained in an amount less than the above range, it is difficult to obtain the effect of adding the softener, i.e. the effect of improving the dispersibility of the rubber and others in the mixture of hydrogenated styrene thermoplastic elastomer and the olefin resin at the time of dynamic crosslinking. If the softener is contained in an amount more than the above range, it is difficult to obtain the effect of improving the strength and the wear resistance of the elastomer composition. Here, in the case of oil-extended rubber, the weight parts of the rubber represent the weight of the rubber component alone which is obtained by subtracting the weight of the oil component from the weight of the oil-extended rubber.

Furthermore, an aging preventive agent, a filler, and the like can be blended into the elastomer composition in accordance with the needs. Examples of the filler include powders of silica, carbon black, clay, talc, calcium carbonate, dibasic phosphite (DLP), basic magnesium carbonate, and alumina. When the filler is blended, the filler is preferably blended in an amount of not more than 15% by weight of the total weight of the elastomer composition. This is due to the following reason. The blending of a filler is effective for improvement the tensile strength, the tear strength, and the like of the elastomer composition; however, if too much filler is blended, the flexibility of the elastomer composition decreases and, when made into a roller, the friction coefficient of the roller tends to fall.

In the present invention, the ratio of the polymer component (rubber+hydrogenated styrene thermoplastic elastomer+olefin resin+resin vulcanizing agent+other added resins) excluding the nonpolymer components such as process oil, aging preventive agent, and filler is preferably not less than 40% by weight and not more than 95% by weight, more preferably not less than 59% by weight and not more than 95% by weight with respect to the total elastomer composition. The ratio is preferably not less than 40% by weight in order to improve the strength (ensuring the wear resistance) of the elastomer composition, while the ratio is preferably not more than 95% by weight in order to ensure the kneading processability and the moldability of the elastomer composition.

The above-described elastomer composition is obtained by putting the aforesaid rubber component (A), mixture composition (B), styrene thermoplastic elastomer (C), resin crosslinking agent, and various other additional blending agents into a kneader and kneaded. The kneaded product is put into a biaxial extruder, where the rubber component (A) is dynamically crosslinked by the resin crosslinking agent while being heated at 160° C. to 200° C., and is dispersed in the mixture composition (B).

The present invention provides a rubber roller formed by using the above-described elastomer composition.

Specifically, the elastomer composition may be extruded with the use of the biaxial extruder to form a pellet, and the pellet may be extruded with the use of an extruder to form a tube, which may be cut into a rubber roller, or else the pellet may be injected with the use of an injection molding apparatus to mold into a tube, and the surface of this molded product may be polished and cut to have a desired dimension to form a rubber roller.

The produced rubber roller is suitably used as a paper feeding roller of an image forming apparatus.

The obtained rubber roller has such a property that the tensile strength TB according to JIS K6301 is not less than 4.5 MPa and not more than 8.5 MPa, and the Shore A hardness Hs according to JIS K6301 is not less than 30 and not more than 50.

If the tensile strength TB is not less than 4.5 MPa and not more than 8.5 MPa, and the Shore A hardness Hs is not less than 30 and not more than 50 as described above, the tensile strength TB can be raised to about not less than 8.5 MPa while maintaining the low hardness permitted as a paper feeding roller. This is effective in the improvement of wear resistance at the time of idling rotation and in the loss of weight on wear, whereby the generation of rubber powder due to repeated use can be reduced.

Because of having the above property, the produced rubber roller can be used suitably as a paper feeding roller of an inkjet printer, a laser printer, an electrostatic copying apparatus, a facsimile apparatus, and the like.

The tensile strength of the above rubber roller is not less than 4.5 and not more than 8.5 because of the following reason. If the tensile strength is less than 4.5, the amount of wear will be large, while if the tensile strength exceeds 8.5, the friction coefficient will be small. The tensile strength is preferably not less than 6.0 MPa and not more than 8.0 MPa.

The Shore A hardness Hs is not less than 30 and not more than 50 because a good flexibility is obtained, and the rubber roller is sufficiently deformed to obtain a large contact area between the rubber roller and the paper or film even if the rubber roller is pressed onto the paper or film with a comparatively small pressing force. If the Shore A hardness Hs is less than 30, the amount of friction will be large, while if the Shore A hardness Hs exceeds 50, non-feeding of paper is generated while the paper is being passed. More preferably, the Shore A hardness Hs is not less than 35 and not more than 45.

The rubber roller of the present invention is specifically used in such a manner that the above-described rubber roller made of the above-described elastomer composition is fitted and fixed onto the outer circumference of a core made of metal or ceramics. If the thickness of the rubber roller is less than 1 mm, the elasticity will be insufficient, so that the conveying performance is liable to fall. Therefore, the thickness of the rubber roller is preferably 1 mm to 20 mm, more preferably 3 mm to 20 mm.

Here, the rubber roller may be one having at least a surface layer made of the above-described elastomer composition on the surface thereof (surface of contact with the conveyed article such as paper or film).

Further, the surface of the rubber roller of the present invention is preferably polished. When the rubber roller is polished, the hydrogenated styrene thermoplastic elastomer which is liable to be polished is polished first, and the rubber is less liable to be polished, so that irregularities (convex parts of the rubber) are effectively formed on the surface of the roller due to the difference in the degree of being polished between the two. Therefore, the surface of the rubber roller is brought into contact with paper so as to obtain a large gripping force to the paper, thereby greatly enhancing the friction coefficient.

DESCRIPTION OF THE PREFERRED EMBODIMENTS

Figure 1:
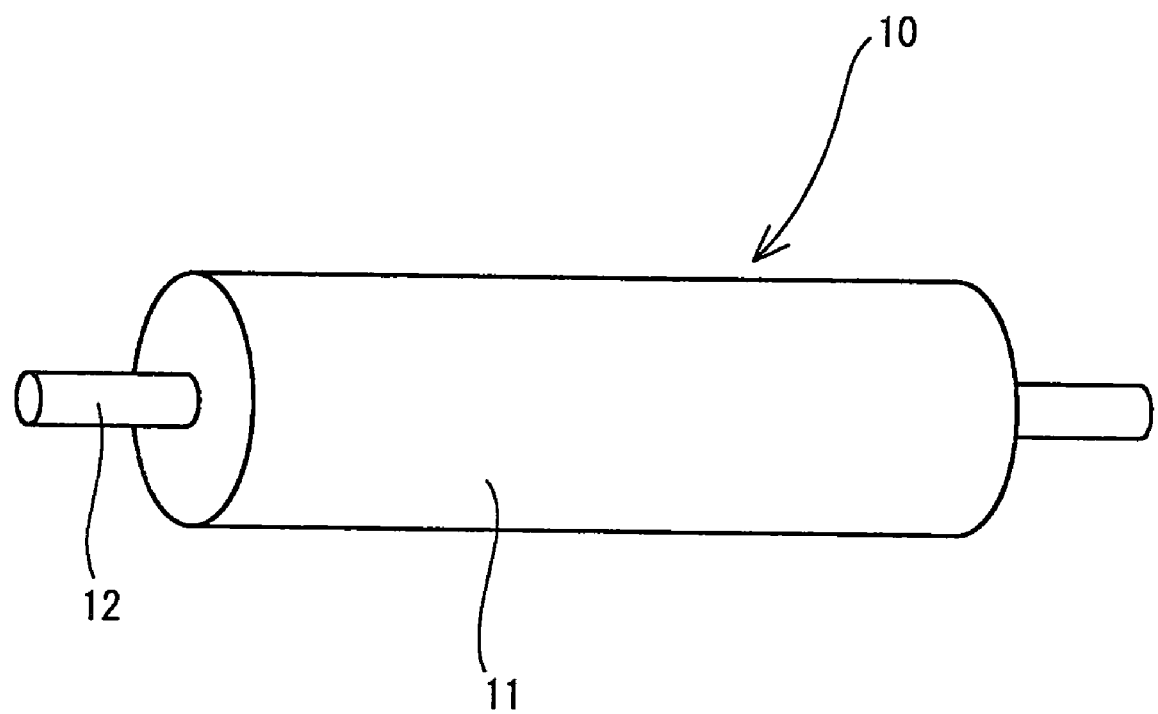
FIG. 1 is a view schematically illustrating a rubber roller according to the present invention.

Hereafter, the embodiments of the present invention will be described with reference to the attached drawings.

The elastomer composition of the present invention contains 200 parts by weight of oil-extended EPDM (100 parts by weight of EPDM rubber+100 parts by weight of paraffin oil) as a rubber component (A) containing at least one of diene rubber and EPDM rubber; 100 parts by weight of PP-containing SEPS compound as a mixture composition (B) containing hydrogenated styrene thermoplastic elastomer and olefin resin; and 50 parts by weight of HYBRAR VS-1 as a styrene thermoplastic elastomer (C) having double bonds partly left, which are dynamically crosslinked with the use of a resin crosslinking agent made of reactive phenol resin and zinc white as a crosslinking aiding agent.

With the above components, the mixture composition (B) is blended at a ratio of 100 parts by weight with respect to 100 parts by weight of the rubber component (A), and the thermoplastic elastomer (C) is blended at a ratio of 100 parts by weight with respect to 200 parts by weight of the mixture composition (B).

This elastomer composition has a tensile strength TB of 7.2 MPa, a hardness Hs of 45, and a loss of weight on friction of 2.2 mg.

The above-described elastomer composition is produced by the following method of producing an elastomer composition according to the present invention.

First, a rubber component (A) containing at least one of diene rubber and EPDM rubber, a mixture composition (B) containing hydrogenated styrene thermoplastic elastomer and olefin resin, a styrene thermoplastic elastomer (C) having double bonds partly left, and a phenol resin crosslinking agent are put into a kneader at a desired blending ratio and kneaded.

This kneaded material is put into a biaxial extruder to carry out dynamic crosslinking at 200° C., whereby the rubber component is uniformly dispersed, and the thermoplastic elastomer composition is prepared as a pellet.

This pellet is extruded to form a tube with the use of a monoaxial extruder, and a core made of metal is inserted into a hollow part to obtain a rubber roller. Referring to FIG. 1, rubber roller 10 includes roller part 11 made of the above-described elastomer composition and formed to have a tubular shape, and an axial core 12 press-fitted as a core into the hollow part of roller part 11, or else the two are fixed by joining with the use of an adhesive.

This can produce a rubber roller having a high tensile strength while maintaining a suitable hardness, and being extremely excellent in wear resistance with less loss of weight on wear. Therefore, it is possible to obtain a paper feeding roller that realizes a suitable hardness and a good wear resistance and, in particular, is excellent in wear resistance at the time of idling rotation.

Besides the above-described embodiments, diene rubber may be used as the rubber component, or else EPDM rubber and diene rubber may be used in combination. Further, as an agent for giving compatibility, EPDM denatured by acid may be used, or may be used in combination with an acid-denatured styrene thermoplastic elastomer. Further, by press-fitting a generally D-shaped core material into a hollow part of the roller part molded to have a tubular shape, a generally D-shaped rubber roller can be formed. Here, knurl-shaped grooves may be provided in the surface of the rubber roller.

Hereafter, Examples and Comparative Examples of the rubber roller produced by using the elastomer composition of the present invention will be described in detail. Rubber rollers were produced at the following blending ratios shown in Table 1.

TABLE 1

|  | Component A | Component B | Component C | TB (MPa) | Hs | Loss of weight on wear (mg) | Rubber powder |
| --- | --- | --- | --- | --- | --- | --- | --- |
| Comparative Example 1 | EPDM 200 | 100 | 0 | 3.9 | 35 | 10.8 | plenty |
| Comparative Example 2 | EPDM 100 | 100 | 100 | 3.8 | 36 | 10.5 | plenty |

TABLE 1-continued

|  | Component A | Component B | Component C | TB (MPa) | Hs | Loss of weight on wear (mg) | Rubber powder |
|---|---|---|---|---|---|---|---|
| Comparative Example 3 | IIR 100 | 100 | 100 | 3.2 | 45 | 15.6 | plenty |
| Example 1 | EPDM 100 | 100 | 50 | 4.5 | 40 | 6.3 | little |
| Example 2 | EPDM 100 | 100 | 30 | 5.6 | 43 | 5.5 | little |
| Example 3 | EPDM 100 | 100 | 10 | 5.6 | 43 | 5.5 | little |
| Example 4 | EPDM 200 | 100 | 10 | 6.7 | 42 | 1.5 | little |
| Example 5 | EPDM 200 | 100 | 30 | 7.3 | 49 | 0.9 | substantially absent |
| Example 6 | EPDM 200 | 100 | 50 | 7.4 | 50 | 0.6 | substantially absent |

Component A
EPDM: ESPRENE 670F manufactured by Sumitomo Chemical Co., Ltd.
IIR: butyl rubber butyl-268 manufactured by Japan Synthetic Rubber Co., Ltd.
Component B
SEPS compound CJK1 (containing PP) manufactured by Kuraray Plastics Co., Ltd.
Component C
HYBRAR VS-1

Rubber component (A); EPDM: ESPRENE 670F manufactured by Sumitomo Chemical Co., Ltd.

IIR: butyl rubber butyl-268 manufactured by Japan Synthetic Rubber Co., Ltd.

Mixture component (B); SEPS+PP: SEPS compound CJK1 (containing PP) manufactured by Kuraray Plastics Co., Ltd.

(hydrogenated styrene thermoplastic elastomer (SEPS): olefin resin (PP))=(100:35)

Thermoplastic elastomer (C); HYBRAR VS-1 manufactured by Kuraray Co., Ltd.

A specific method of producing a rubber roller will be described.

First, materials were weighed, and rubber component (A), 12 parts by weight of resin crosslinking agent (manufactured by Taoka Chemical Co., Ltd., TACKROL 250-III), and 5 parts by weight of zinc white were blended with rubber component (A), mixture composition (B), and thermoplastic elastomer composition (C). The blended product was put into a tumbler and mixed at 23° C. for 10 minutes. Thereafter, dynamic crosslinking was carried out at 200° C. in a biaxial extruder (HTM38 manufactured by Aibeck Co., Ltd.) to prepare a thermoplastic elastomer composition, which was then extruded to form a pellet.

Subsequently, this pellet was extruded to form a tube by using a monoaxial extruder (φ 50 extruder manufactured by Kasamatsu Processing Institute Co., Ltd., 20 rpm, temperature regulation: 190° C. to 230° C.) thereby to obtain an extruded molded product having an outer diameter of 22 mm and an inner diameter of 18 mm. This tube-shaped extruded molded product was cut into a predetermined dimension to have a 15 mm width to form a rubber roller. A core was inserted into its hollow part and fixed.

EXAMPLES 1 TO 6

Rubber component (A), mixture composition (B), and thermoplastic styrene elastomer composition (C) were blended as shown in Table 1. Namely, styrene elastomer composition (C) was blended at a ratio of not less than 2 parts by weight and not more than 100 parts by weight with respect to 200 parts by weight of mixture composition (B), and EPDM was used as the rubber component.

COMPARATIVE EXAMPLES 1 TO 3

As shown in Table 1, elastomer composition (C) was not used in Comparative Example 1. In Comparative Examples 2 and 3, mixture composition (B) and elastomer composition (C) were used in equal amounts.

With respect to the rubber rollers of the above Examples and Comparative Examples, evaluation was carried out on the tensile strength TB, hardness Hs, loss of weight on wear, and generation of rubber powder by a method described later. The results of evaluation are shown in Table 1.

(Tensile Strength)
The dynamically crosslinked composition was molded into a sheet form by injection, and the tensile strength TB was measured on the basis of JIS K6301.

(Hardness)
Hardness Hs is a Shore A hardness, and measurement was carried out on the basis of JIS K6301.

(Loss of Weight on Friction)
A cut product was fitted onto a round core having a diameter of 20 mm and rotated by idling on a releasing member (sheet made of rubber) at 100 rpm by applying a load of 300 g. The loss of weight (mg) was measured before and after wearing, and the degree of rubber powder creation was confirmed by eye inspection. Regarding the loss of weight on friction, less than 7 mg was determined as good.

As shown in Table 1, Examples 1 to 6 had a high tensile strength TB of 4.5 to 7.4 MPa, and a low loss of weight on wear of 0.6 to 6.3 mg. Further, the Shore A hardness was 40 to 50 which was a low hardness permissible for a roller, and the amount of rubber powder creation was little or substantially absent.

On the other hand, Comparative Example 1 in which no thermoplastic elastomer (C) was blended and Comparative Examples 2 and 3 in which the blended amount was large had a low tensile strength of less than 4.5 MPa, so as to have a large loss of weight on wear of 10.8 to 15.6, and a lot of rubber powder was created.

As will be clearly understood from the above description, the elastomer composition of the present invention is produced by blending diene rubber or EPDM rubber (A), mixture composition (B) containing styrene thermoplastic elastomer and olefin resin, and styrene thermoplastic elastomer (C) having double bonds partly left, at a predetermined ratio, and the bonding between the resin component and the rubber component is enhanced by this styrene thermoplastic elastomer (C), so that the tensile strength can be enhanced, and the elastomer composition has an excellent wear resistance and a suitable hardness.

The rubber roller formed by using the above-described elastomer composition has a high tensile strength TB and a good friction resistance while having a suitable hardness, so that it is used suitably as a paper feeding rubber roller that receives a high load at the time of idling rotation. Therefore, the rubber roller of the present invention is suitable as a paper feeding roller that rotates by idling relative to a releasing member each time a sheet of paper is fed, and hence requires not only a high friction coefficient but also a high friction resistance in a paper feeding mechanism of OA equipment such as an inkjet printer, a laser printer, an electrostatic copying apparatus or a facsimile apparatus, or an automatic deposit payment machine (ATM) or the like.

What is claimed is:

1. An elastomer composition containing:
    a rubber component (A) containing at least one or more kinds of rubbers selected from the group consisting of butyl rubber (IIR), butadiene rubber (BR), isoprene rubber (IR), chloroprene rubber (CR), natural rubber (NR), 1,2-polybutadiene, acrylonitrile-butadiene rubber (NBR) and EPDM rubber;
    a mixture composition (B) containing hydrogenated styrene thermoplastic elastomer and olefin resin; and
    a styrene thermoplastic elastomer (C) having double bonds partly left, wherein
    said styrene thermoplastic elastomer (C) is blended at a ratio of not less than 2 parts by weight and not more than 100 parts by weight with respect to 200 parts by weight of said mixture composition (B), and
    said rubber component (A) is dynamically crosslinked by a resin crosslinking agent, and
    said rubber component (A) is dispersed by dynamic crosslinking in said mixture composition (B) having said styrene thermoplastic elastomer (C) dispersed therein, and
    said hydrogenated styrene thermoplastic elastomer of mixture composition (B) does not have double bonds and does not react with resin vulcanizing agents, and
    said mixture composition (B) is blended at a ratio of not less than 2 parts by weight and not more than 100 parts by weight with respect to 100 parts by weight of said rubber component (A), and
    wherein the weight ratio of hydrogenated styrene thermoplastic elastomer and olefin resin in said mixture composition (B) is (hydrogenated styrene thermoplastic elastomer:olefin resin) equals (100:0.1) to (2:50).

2. A rubber roller formed by using the elastomer composition of claim 1.

3. The rubber roller of claim 2, wherein the tensile strength TB according to JIS K6301 is not less than 4.5 MPa and not more than 8.5 MPa, and the Shore A hardness Hs according to JIS K6301 is not less than 30 and not more than 50.

4. An image forming apparatus which comprises the rubber roller of claim 2 as a paper feeding roller.

5. An image forming apparatus which comprises the rubber roller of claim 3 as a paper feeding roller.

* * * * *